US012787112B2

(12) United States Patent
Zheng et al.

(10) Patent No.: US 12,787,112 B2
(45) Date of Patent: Nov. 3, 2026

(54) UNICAST SIDELINK CONFIGURATION METHOD AND TERMINAL

(71) Applicant: VIVO MOBILE COMMUNICATION CO., LTD., Dongguan (CN)

(72) Inventors: Qian Zheng, Dongguan (CN); Jianming Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 283 days.

(21) Appl. No.: 18/403,925

(22) Filed: Jan. 4, 2024

(65) Prior Publication Data

US 2024/0163964 A1 May 16, 2024

Related U.S. Application Data

(63) Continuation of application No. PCT/CN2022/101869, filed on Jun. 28, 2022.

(30) Foreign Application Priority Data

Jul. 5, 2021 (CN) ......................... 202110758772.1

(51) Int. Cl.
*H04W 76/28* (2018.01)
*H04W 76/10* (2018.01)
(Continued)

(52) U.S. Cl.
CPC ........... *H04W 76/28* (2018.02); *H04W 76/10* (2018.02); *H04W 76/27* (2018.02); *H04W 92/18* (2013.01)

(58) Field of Classification Search
CPC ..... H04W 76/28; H04W 76/27; H04W 76/10; H04W 92/18
See application file for complete search history.

(56) References Cited

U.S. PATENT DOCUMENTS

2020/0314947 A1 10/2020 Latheef et al.
2022/0174781 A1 6/2022 Yang et al.
(Continued)

FOREIGN PATENT DOCUMENTS

CN 102014441 A 4/2011
CN 111800894 A 10/2020
(Continued)

OTHER PUBLICATIONS

Ericsson et al., "General aspects of SL DRX", 3GPP TSG-RAN WG2 #113bis-e, Electronic meeting, Apr. 12-20, 2021, R2-2103003.
(Continued)

*Primary Examiner* — Duc C Ho
(74) *Attorney, Agent, or Firm* — The Webb Law Firm

(57) ABSTRACT

A unicast sidelink configuration method includes during a unicast sidelink establishment process, receiving, by a receive end configured with DRX mode, first RRC parameter configuration information and first DRX parameter configuration information from a transmit end; and receiving, by the receive end, the first RRC parameter configuration information resent by the transmit end, in a case that first RRC parameter configuration fails, and/or receiving, by the receive end, the first DRX parameter configuration information resent by the transmit end, in a case that first DRX parameter configuration fails.

8 Claims, 5 Drawing Sheets

(51) Int. Cl.

| | |
|---|---|
| ***H04W 76/27*** | (2018.01) |
| *H04W 92/18* | (2009.01) |

(56) References Cited

U.S. PATENT DOCUMENTS

| | | | | |
|---|---|---|---|---|
| 2022/0191795 | A1* | 6/2022 | Pan | H04W 52/0219 |
| 2022/0295595 | A1 | 9/2022 | Fan et al. | |
| 2022/0304103 | A1* | 9/2022 | Cheng | H04W 76/14 |
| 2023/0309016 | A1* | 9/2023 | Li | H04W 76/14 |

FOREIGN PATENT DOCUMENTS

| | | | |
|---|---|---|---|
| CN | 112888051 | A | 6/2021 |
| EP | 4297519 | A1 | 12/2023 |
| WO | 2021119474 | A1 | 6/2021 |
| WO | 2022083440 | A1 | 4/2022 |

OTHER PUBLICATIONS

Intel Corporation, "Alignment of DRX wake up times", 3GPP TSG RAN WG2 Meeting #112-e, Electronic meeting, Nov. 2-13, 2020, R2-2008988.

OPPO, "Summary of [AT113-e][707]", 3GPP TSG-RAN WG2 #113-e, E-meeting, Jan. 2021, R2-2102183.

Lenova et al., "DRX Configuration for UC BC GC and its interaction with Sensing", 3GPP TSG-RAN WG2 Meeting #114 electronic, May 19-May 27, 2021, R2-2105073.

LG Electronics Inc., "Alignment scheme for Uu DRX and SL DRX", 3GPP TSG-RAN WG2 Meeting #113 electronic, Jan. 25-Feb. 5, 2021, R2-2101791.

* cited by examiner

UNICAST SIDELINK CONFIGURATION METHOD AND TERMINAL

CROSS-REFERENCE TO RELATED APPLICATIONS

This application is a Bypass Continuation Application of International Patent Application No. PCT/CN2022/101869, filed Jun. 28, 2022, and claims priority to Chinese Patent Application No. 202110758772.1, filed Jul. 5, 2021, the disclosures of which are hereby incorporated by reference in their entireties.

BACKGROUND OF THE INVENTION

Field of the Invention

This application pertains to the communication field, and particularly relates to a unicast sidelink configuration method and apparatus, and a terminal.

Description of Related Art

A direct communication interface (PC5) discontinuous reception (DRX) parameter for new radio (NR) sidelink (SL) unicast can be configured through information exchange between user equipments (UE, also referred to as a terminal) at the access stratum (AS) based on quality of service (QoS) profiles required by different services. In other words, a receive terminal (Receive UE or Peer UE, Rx UE, also referred to as a receive end) sends assistance information to a transmit terminal (Transmit UE, Tx UE, also referred to as a transmit end), and the Tx UE determines the PC5 DRX for unicast based on the information from the Rx UE and the QoS required by its service.

SUMMARY OF THE INVENTION

According to a first aspect, a unicast sidelink configuration method is provided and includes:

during a unicast sidelink establishment process, receiving, by a receive end configured with discontinuous reception DRX mode, first radio resource control (RRC) parameter configuration information and first DRX parameter configuration information from a transmit end; and receiving, by the receive end, the first RRC parameter configuration information resent by the transmit end, in a case that first RRC parameter configuration fails, and/or receiving, by the receive end, the first DRX parameter configuration information resent by the transmit end, in a case that first DRX parameter configuration fails.

According to a second aspect, a unicast sidelink configuration apparatus is provided. The apparatus is applied to a receive end configured with discontinuous reception DRX mode, and includes:

a first receiving module, configured to: during a unicast sidelink establishment process, receive first radio resource control RRC parameter configuration information and first DRX parameter configuration information from a transmit end; and a second receiving module, configured to: receive the first RRC parameter configuration information resent by the transmit end, in a case that first RRC parameter configuration fails, and/or receive the first DRX parameter configuration information resent by the transmit end, in a case that first DRX parameter configuration fails.

According to a third aspect, a unicast sidelink configuration method is provided and includes:

during a unicast sidelink establishment process, sending, by a transmit end, first radio resource control RRC parameter configuration information and first DRX parameter configuration information to a receive end configured with discontinuous reception DRX mode; and resending, by the transmit end, the first RRC parameter configuration information to the receive end in a case that first RRC parameter configuration fails, and/or resending, by the transmit end, the first DRX parameter configuration information to the receive end in a case that first DRX parameter configuration fails.

According to a fourth aspect, a unicast sidelink configuration apparatus is provided.

The apparatus is applied to a transmit end and includes:

a first sending module, configured to: during a unicast sidelink establishment process, send first radio resource control RRC parameter configuration information and first DRX parameter configuration information to a receive end configured with discontinuous reception DRX mode; and a second sending module, configured to resend the first RRC parameter configuration information to the receive end in a case that first RRC parameter configuration fails, and/or resend the first DRX parameter configuration information to the receive end in a case that first DRX parameter configuration fails.

According to a fifth aspect, a terminal is provided. The terminal is a receive end configured with discontinuous reception DRX mode. The terminal includes a processor, a memory, and a program or instructions stored in the memory and executable on the processor. When the program or instructions are executed by the processor, the steps of the method according to the first aspect are implemented.

According to a sixth aspect, a terminal is provided. The terminal is a receive end configured with discontinuous reception DRX mode, and includes a processor and a communication interface. The communication interface is configured to: during a unicast sidelink establishment process, receive first radio resource control RRC parameter configuration information and first DRX parameter configuration information from a transmit end; and receive the first RRC parameter configuration information resent by the transmit end, in a case that first RRC parameter configuration fails, and/or receive the first DRX parameter configuration information resent by the transmit end, in a case that first DRX parameter configuration fails.

According to a seventh aspect, a terminal is provided. The terminal includes a processor, a memory, and a program or instructions stored in the memory and executable on the processor. When the program or instructions are executed by the processor, the steps of the method according to the third aspect are implemented.

According to an eighth aspect, a terminal is provided. The terminal is a transmit end and includes a processor and a communication interface. The communication interface is configured to: during a unicast sidelink establishment process, send first radio resource control RRC parameter configuration information and first DRX parameter configuration information to a receive end configured with discontinuous reception DRX mode; and resend the first RRC parameter configuration information to the receive end in a case that first RRC parameter configuration fails, and/or resend the first DRX parameter configuration information to the receive end in a case that first DRX parameter configuration fails.

According to a ninth aspect, a non-transitory readable storage medium is provided. The non-transitory readable storage medium stores a program or instructions. When the program or instructions are executed by a processor, the steps of the method according to the first aspect or the steps of the method according to the third aspect are implemented.

According to a tenth aspect, a chip is provided. The chip includes a processor and a communication interface, where the communication interface is coupled to the processor, and the processor is configured to run a program or instructions to implement the steps of the method according to the first aspect or the third aspect.

According to an eleventh aspect, a computer program product is provided. The computer program product is stored in a non-volatile storage medium, and the computer program product is executed by at least one processor to implement the steps of the method according to the first aspect or the third aspect.

According to a twelfth aspect, a communications device is provided and configured to implement the method according to the first aspect or the third aspect.

DESCRIPTION OF THE INVENTION

Figure 1:
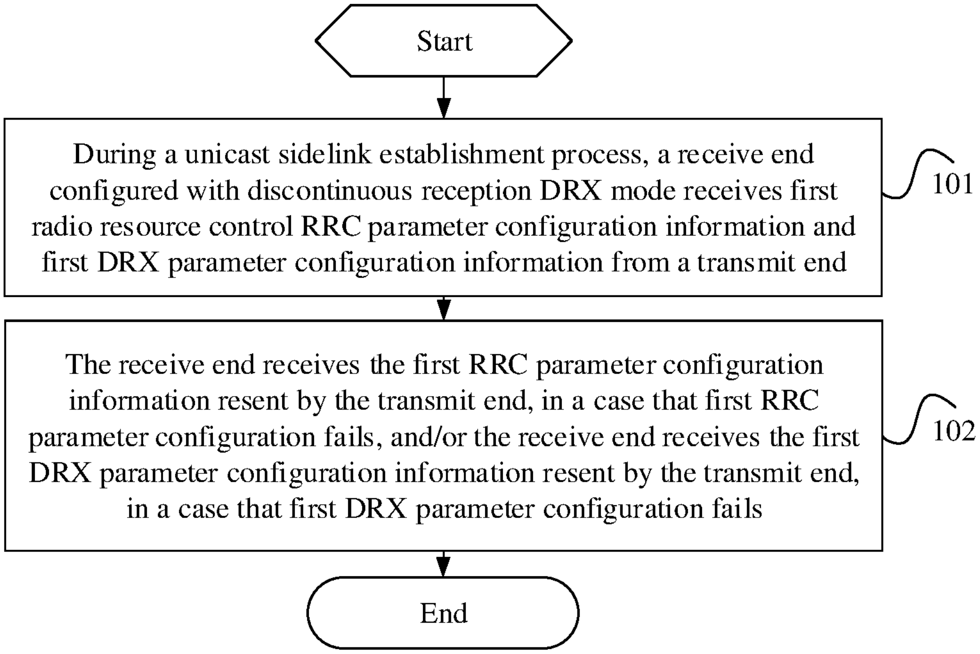
FIG. 1 is a schematic flowchart of a unicast sidelink configuration method applied to a receive end according to an embodiment of this application.

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

The terms "first", "second", and the like in this specification and claims of this application are used to distinguish between similar objects rather than to describe a specific order or sequence. It should be understood that terms used in this way are interchangeable in appropriate circumstances so that the embodiments of this application can be implemented in other orders than the order illustrated or described herein. In addition, "first" and "second" are usually used to distinguish objects of a same type, and do not restrict a quantity of objects. For example, there may be one or a plurality of first objects. In addition, "and/or" in the specification and claims represents at least one of connected objects, and the character "/" generally indicates that the associated objects have an "or" relationship.

It should be noted that the technologies described in the embodiments of this application are not limited to long term evolution (LTE)/LTE-Advanced (LTE-A) systems, and may also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for an illustration purpose, and the NR term is used in most of the following descriptions, but these technologies may also be applied to other applications than an NR system application, for example, the 6th generation (6G) communications system.

The following describes in detail the unicast sidelink configuration method and apparatus, and terminal provided in the embodiments of this application by using some embodiments and application scenarios thereof with reference to the accompanying drawings.

Generally, the Tx UE can configure parameters of specific PC5 DRX through the desired QoS Profile or PC5 QoS ID (PQI). The vehicle to everything (V2X) stratum provides such information to the AS stratum where UEs in unicast negotiate through information exchange. Then, the Tx UE determines the final PC5 DRX configuration based on the assistance information provided by the Rx UE and the QoS Profile information required by the service. Therefore, at the AS stratum, the Tx UE can effectively configure the PC5 DRX parameters based on its service property/feature in combination with the assistance information provided by the Rx UE.

In a case that DRX is not implemented on the Rx UE, the Rx UE does not need the QoS Profile information of the Tx UE for receiving packets. However, in a case that DRX is implemented on the Rx UE, the DRX parameters are determined based on the QoS Profile information of the Tx UE. In the initial stage of a service, that is, before a unicast sidelink is established between UEs in unicast, the Rx UE in unicast cannot obtain the QoS Profile information of the Tx UE. In the absence of the relevant QoS Profile information of the Tx UE, the Rx UE cannot determine the DRX parameters, meaning that the Rx UE cannot enter unicast energy-efficient mode after a unicast sidelink is established.

As shown in FIG. 1, an embodiment of this application provides a unicast sidelink configuration method. The method includes the following steps.

Step 101. During a unicast sidelink establishment process, a receive end configured with discontinuous reception DRX mode receives first radio resource control RRC parameter configuration information and first DRX parameter configuration information from a transmit end.

It should be noted that optionally, the first RRC parameter configuration information in this embodiment of this application refers to PC5-RRC normal parameter configuration information required for wireless communication.

It should be noted that with respect to PC5 DRX, this application mainly includes default PC5 DRX and specific PC5 DRX. Certainly, there are other types of DRX. Before a unicast sidelink is established, a terminal usually uses default PC5 DRX, and parameters of the default PC5 DRX are pre-configured. In this embodiment of this application, Specific PC5 DRX is mainly configured during the unicast link establishment process, and Specific PC5 DRX is used only during a unicast link communication process. In other words, the first DRX parameter configuration information described in this embodiment of this application may refer to the parameter configuration information of Specific PC5 DRX.

Step 102. The receive end receives the first RRC parameter configuration information resent by the transmit end, in a case that first RRC parameter configuration fails, and/or the receive end receives the first DRX parameter configuration information resent by the transmit end, in a case that first DRX parameter configuration fails.

In this embodiment of this application, it should be noted that in the configuration process, only a parameter that fails to be configured is reconfigured, instead of all parameters. This can improve the configuration efficiency and reduce the signaling overheads in the unicast link establishment process.

It should be noted herein that when a service is implemented between terminals, the terminal sending service packets is called a transmit terminal (Tx UE, also referred to as the transmit end), and the terminal receiving the service packets is called a receive terminal (Rx UE, also referred to as the receive end).

In general, the data amount of the PC5-RRC NORMAL parameter configuration information is much larger than the data amount of the Specific PC5 DRX parameter configuration information, and configuration requirements of the Rx UE for the PC5-RRC NORMAL parameters are largely dependent on the Tx UE. The Rx UE does not send assistance information during configuration of the PC5-RRC NORMAL parameters, but sends assistance information during configuration of the Specific PC5 DRX parameters. Therefore, the success rate of configuring the PC5-RRC NORMAL parameters is much higher than that of configuring the Specific PC5 DRX parameters.

To improve the configuration efficiency, this application proposes the following three methods for configuring the PC5-RRC NORMAL parameters and the Specific PC5 DRX parameters.

Configuration Method 1: Mixed Configuration Method Used by the Tx UE

In this case, step 101 is implemented as follows.

During the unicast sidelink establishment process, the receive end receives the first RRC parameter configuration information and the first DRX parameter configuration information simultaneously sent by the transmit end via the sidelink RRC configuration information.

That is, during the unicast sidelink establishment process, the receive end receives the PC5-RRC normal parameter configuration information and the first DRX parameter configuration information simultaneously sent by the transmit end via one piece of the sidelink RRC configuration (RRCReconfigurationSidelink) information.

In a case that both the PC5-RRC normal parameters and the first DRX parameters are successfully configured, the receive end sends sidelink radio resource control configuration complete (RRCReconfigurationCompleteSidelink) information to the transmit end.

In a case that configuration of at least the PC5-RRC normal parameters fails, the receive end sends sidelink RRC configuration failure (RRCReconfigurationFailureSidelink) information to the transmit end, and upon reception of the sidelink RRC configuration failure information, the transmit end resends the first RRC parameter configuration information and the first DRX parameter configuration information to the receive end via the sidelink RRC configuration information.

In a case that the PC5-RRC normal parameter configuration succeeds but the first DRX parameter configuration fails, the receive end sends assistance information to the transmit end, where the assistance information is used to indicate the transmit end to resend the first DRX parameter configuration information.

In other words, the Tx UE configures both the PC5-RRC NORMAL parameters and the Specific PC5 DRX parameters for the Rx UE via one piece of RRCReconfigurationSidelink, and the Rx UE sends success acknowledgment information via the sidelink RRC configuration complete (RRCReconfigurationCompleteSidelink) information only when the Rx UE acknowledges that both the PC5-RRC NORMAL parameters and the Specific PC5 DRX parameters are configured successfully. In a case that configuration of the PC5-RRC normal parameters fails, the Rx UE sends RRCReconfigurationFailureSidelink to acknowledge that the configuration fails. In this case, the Rx UE needs to reconfigure the PC5-RRC NORMAL parameters and the Specific PC5 DRX parameters, that is, the Rx UE resends the PC5-RRC NORMAL parameter configuration information and Specific PC5 DRX parameter configuration information via RRCReconfigurationSidelink. In a case that configuration of only the Specific PC5 DRX parameters fails, the Rx UE does not send RRCReconfigurationFailureSidelink, but sends assistance information to the Tx UE via terminal sidelink assistance information (UEAssistanceInformationSidelink) (this method can be considered an implicit indication method, that is, Specific PC5 DRX parameter configuration failure is implicitly indicated as long as the assistance information is sent), requesting the Tx UE to reconfigure the Specific PC5 DRX parameters. After receiving the assistance information, the Tx UE determines that the Specific PC5 DRX parameter configuration fails, and resends the Specific PC5 DRX parameter configuration information to the Rx UE.

Configuration Method 2: Parallel Configuration Method Used by the Tx UE

In this case, step 101 is implemented as follows.

During the unicast sidelink establishment process, the receive end receives the first RRC parameter configuration information and the first DRX parameter configuration information simultaneously sent by the transmit end via the sidelink RRC configuration information.

That is, during the unicast sidelink establishment process, the receive end receives the PC5-RRC normal parameter configuration information and the first DRX parameter configuration information configured together by the transmit end via one piece of the sidelink RRC configuration information.

In a case that first RRC parameter configuration fails, the receive end sends first sidelink RRC configuration failure information to the transmit end. After receiving the first sidelink RRC configuration failure information, the transmit end resends the first RRC parameter configuration information, and the receive end only needs to receive the first RRC parameter configuration information again.

In a case that first DRX parameter configuration fails, the receive end sends second sidelink RRC configuration failure information or assistance information to the transmit end. After receiving the second sidelink RRC configuration failure information or assistance information, the transmit end resends the first DRX parameter configuration information, and the receive end only needs to receive the first DRX parameter configuration information again.

The receive end sends first sidelink RRC configuration complete information to the transmit end in a case that first RRC parameter configuration succeeds; and sends second sidelink RRC configuration complete information to the transmit end in a case that first DRX parameter configuration succeeds.

It should be noted that in this case, the transmit end sends the PC5-RRC normal parameter configuration information and the SPECIFIC PC5 DRX parameter configuration information together to the receive end via one piece of sidelink RRC configuration information. After receiving the first sidelink RRC configuration failure information, the transmit end needs to resend the PC5-RRC NORMAL parameter configuration information to the receive end. In a case that new PC5-RRC NORMAL parameters are configured successfully, the receive end sends the first sidelink RRC configuration complete information to the transmit end; otherwise, the receive end keeps sending the first sidelink RRC configuration failure information to the transmit end until PC5-RRC NORMAL parameter configuration succeeds. After receiving second sidelink RRC configuration failure information, the transmit end needs to resend the Specific PC5 DRX parameter configuration information to the receive end. In a case that new Specific PC5 DRX parameters are configured successfully, the receive end sends the second sidelink RRC configuration complete information to the transmit end; otherwise, the receive end keeps sending the second sidelink RRC configuration failure information to the transmit end until Specific PC5 DRX parameter configuration succeeds.

It should be noted that such case is based on that the Tx UE configures both the PC5-RRC typical parameters and the Specific PC5 DRX parameters for the Rx UE, but the Rx UE separately acknowledges whether each configuration is successful.

For example, the Tx UE can configure both the PC5-RRC NORMAL parameters and the Specific PC5 DRX parameters via RRCReconfigurationSidelink, and the Rx UE sends feedback information on the PC5-RRC NORMAL parameters and the Specific PC5 DRX parameters via different RRCReconfigurationCompleteSidelink and different RRCReconfigurationFailureSidelink, so that the Tx UE can configure the PC5-RRC NORMAL parameters and the Specific PC5 DRX parameters separately. For example, in a case that PC5-RRC NORMAL parameter configuration succeeds, the Rx UE sends acknowledgement information with respect to the PC5-RRC NORMAL parameters via RRCReconfigurationCompleteSidelink1; otherwise, the Rx UE sends RRCReconfigurationFailureSidelink1 to request reconfiguration of the PC5-RRC NORMAL parameters. In a case that Specific PC5 DRX parameter configuration succeeds, the Rx UE sends acknowledgement information with respect to Specific PC5 DRX parameters via RRCReconfigurationCompleteSidelink2; otherwise, the Rx UE sends RRCReconfigurationFailureSidelink2 to request reconfiguration of the Specific PC5 DRX parameters.

It should be noted that this method can be considered an explicit indication method because different sidelink RRC configuration failure information is used for failure feedback regarding PC5-RRC NORMAL parameter configuration and Specific PC5 DRX parameter configuration.

Configuration Method 3: Serial Configuration Method Used by Tx UE

In this case, step 101 is implemented as follows.

During the unicast sidelink establishment process, the receive end receives first target parameter configuration information sent by the transmit end via sidelink RRC configuration information.

The receive end sends sidelink RRC configuration complete information to the transmit end in a case that first target parameter configuration succeeds.

The receive end receives second target parameter configuration information sent by the transmit end via the sidelink RRC configuration information.

The first target parameter configuration information is one of the first RRC parameter configuration information and the first DRX parameter configuration information, and the second target parameter configuration information is another of the first RRC parameter configuration information and the first DRX parameter configuration information.

In other words, such case refers to that first target parameter configuration is performed first. In a case that first target parameter configuration fails, the receive end sends sidelink RRC configuration failure information to the transmit end, and the transmit end resends the first target parameter configuration information after receiving the sidelink RRC configuration failure information. The transmit end sends second target parameter configuration information only after the receive end sends the sidelink RRC configuration complete information. In a case that second target parameter configuration succeeds, the receive end sends the sidelink radio resource control configuration complete information to the transmit end. In a case that second target parameter configuration fails, the receive end sends the sidelink radio resource control configuration failure information to the transmit end, and the transmit end resends the second target parameter configuration information after receiving the sidelink RRC configuration failure information.

It should be noted herein that with respect to the first DRX parameter configuration information, if first DRX parameter configuration fails, the receive end needs to send assistance information for reconfiguration of the first DRX parameters. Therefore, in a case that the first target parameter configuration information or the second target parameter configuration information is the first DRX parameter configuration information, if first DRX parameter configuration fails, the receive end may send the sidelink RRC configuration failure information or assistance information.

It should be noted that in this method, the Tx UE separately configures the PC5-RRC NORMAL parameters and the Specific PC5 DRX parameters for the Rx UE. For example, the Tx UE first configures PC5-RRC NORMAL parameters for the Rx UE via RRCReconfigurationSidelink. If the Rx UE considers that the PC5-RRC NORMAL parameters are successfully configured, the Rx UE sends acknowledgment information via RRCReconfigurationCompleteSidelink. Then, the Tx UE configures Specific PC5 DRX parameters for the Rx UE via RRCReconfigurationSidelink. If the Rx UE does not acknowledge the Specific PC5 DRX parameters configured by the Tx UE, the Rx UE sends assistance information to the Tx UE via UEAssistanceInformationSidelink and informs the Tx UE of its own PC5 DRX configuration preference via drx-PreferenceConfigSidelink. Then, the Tx UE reconfigures the Specific PC5 DRX parameters for the Rx UE based on the assistance information provided by the Rx UE and the QoS information required by the service.

During configuration of the PC5-RRC NORMAL parameters and the Specific PC5 DRX parameters for UEs in unicast, the Rx UE only needs to send acknowledgment information via the same RRCReconfigurationCompleteSidelink.

It should be noted that because the data amount of the configured PC5-RRC NORMAL parameters is much larger than that of the Specific PC5 DRX parameters, and the configuration requirements of the Rx UE for the PC5-RRC NORMAL parameters are largely dependent on the Tx UE, the success rate of configuring the PC5-RRC NORMAL parameters is much higher than that of configuring the Specific PC5 DRX. Therefore, the separate configuration method can improve the system configuration efficiency.

It should be noted that the order of configuring the PC5-RRC NORMAL parameters and the Specific PC5 DRX parameters is not limited in this application. The Tx UE may configure the Specific PC5 DRX parameters and then the PC5-RRC NORMAL parameters for the Rx UE, or the Tx UE may configure the PC5-RRC NORMAL parameters and then the Specific PC5 DRX parameters for the Rx UE.

Therefore, before the Specific PC5 DRX parameters are configured, information must be sent within On-duration of Default PC5 DRX or within an extended time (an offset of time (Time Offset) or an extension time) subsequent to On-duration of Default PC5 DRX. This is because Specific PC5 DRX configuration is considered as complete only when the last RRCReconfigurationCompleteSidelink is sent by the Rx UE and received by the Tx UE.

Due to service change, a PC5 QoS Flow may be added, changed, or removed. In a case that PC5 QoS Flow(s) is changed, Specific PC5 DRX should be updated accordingly. Unicast sidelink update is determined at the V2X stratum of each UE. Once the UE determines to update a unicast sidelink, the V2X stratum provides information about the unicast sidelink update for the AS stratum, and finally the AS stratum performs the unicast sidelink update.

An update may be initiated by the receive end or the transmit end. Descriptions of the two modes are as follows.

1. Initiated by the Transmit End

In this case, the implementation is as follows. The receive end receives a link update request, where the link update request is used to indicate to update the first DRX parameter configuration information; and the receive end updates the first DRX parameter configuration information after sending sidelink radio resource control configuration complete information to the transmit end.

It should be noted that if the transmit end sends a link update request to the receive end, the transmit end updates the first DRX parameter configuration information after receiving sidelink radio resource control configuration complete information from the receive end.

2. Initiated by the Receive End

In this case, the implementation is as follows. The receive end sends a link update request, where the link update request is used to indicate that the first DRX parameter configuration information is to be updated; and the receive end updates the first DRX parameter configuration information after receiving sidelink radio resource control configuration complete information from the transmit end.

It should be noted that if the receive end sends a link update request, the transmit end receives the link update request from the receive end, sends sidelink radio resource control configuration complete information to the receive end, and then updates the first DRX parameter configuration information.

In conclusion, the process of updating a unicast sidelink is as follows. When UE-2 in unicast expects to update the unicast sidelink, this UE sends a link modification request to UE-1. In a case that UE-1 receives the sidelink update request and acknowledges the sidelink update, UE-1 sends link modification accept information to UE-2.

During the sidelink update process, communication between the UEs in unicast is still based on the existing Specific PC5 DRX. The communication between UEs in unicast is switched to the new Specific PC5 DRX configuration only after the sidelink update is completed. That is, update of the Specific PC5 DRX parameters is considered as complete only when RRCReconfigurationCompleteSidelink is sent by UE-1 and received by UE-2. In this case, the new Specific PC5 DRX parameters can be used for the communication between the UEs in unicast. This solves the problem of inconsistency between different Specific PC5 DRX based on different QoS configurations. The point of time when RRCReconfigurationCompleteSidelink is sent and received is used as the switching time for Specific PC5 DRX parameter configuration, allowing for more flexible and effective alignment of unicast Specific PC5 DRX configurations.

The following illustrates some application scenarios of this application.

Application Scenario 1

Figure 2:
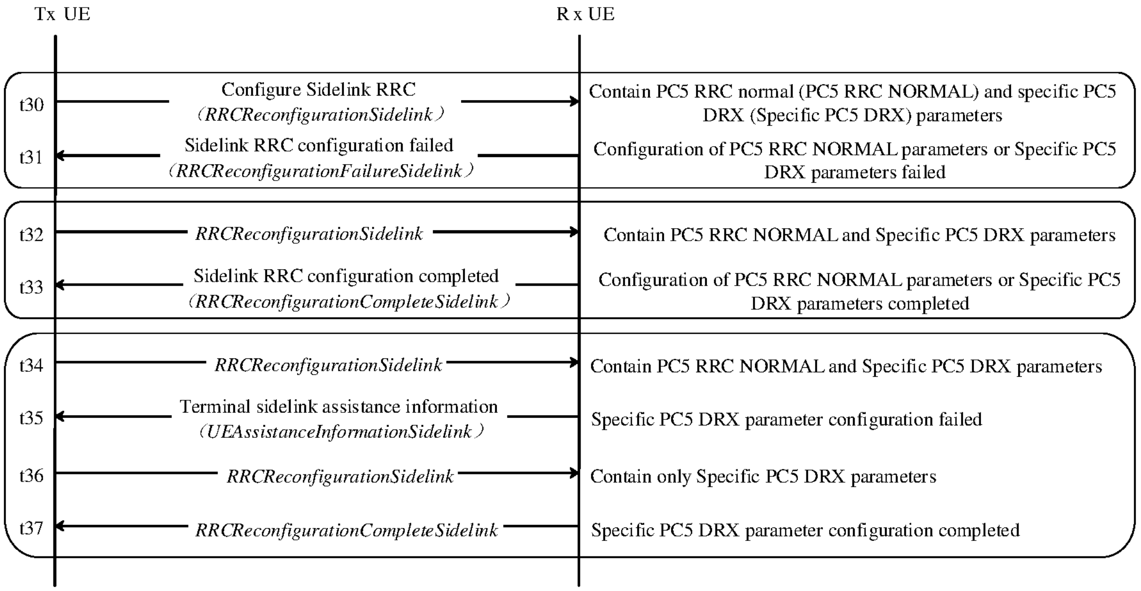
FIG. 2 is a schematic flowchart of a mixed configuration method.

As shown in FIG. 2, in the mixed configuration method, optionally, the Tx UE configures PC5-RRC NORMAL parameters and Specific PC5 DRX parameters (namely, the PC5-RRC NORMAL parameters and the Specific PC5 DRX parameters) for the Rx UE via RRCReconfigurationSidelink at time t30. Because configuration of the PC5-RRC NORMAL parameters or the Specific PC5 DRX parameters fails, the Rx UE sends configuration failure information via RRCReconfigurationFailureSidelink at time t31.

Optionally, the Tx UE configures the PC5-RRC NORMAL and Specific PC5 DRX parameters for the Rx UE via RRCReconfigurationSidelink at time t32. Because configuration of the PC5-RRC NORMAL parameters and Specific PC5 DRX parameters succeeds, the Rx UE sends configuration success information via RRCReconfigurationCompleteSidelink at time t33.

Optionally, at time t34, the Tx UE configures the PC5-RRC NORMAL parameters and Specific PC5 DRX parameters for the Rx UE via RRCReconfigurationSidelink. Configuration of the PC5-RRC NORMAL parameters succeeds but configuration of the Specific PC5 DRX parameters fails. Therefore, at time t35, the Rx UE does not send configuration failure information to the Tx UE via RRCReconfigurationFailureSidelink but sends relevant assistance information to the Tx UE via UEAssistanceInformationSidelink. This means that the Rx UE implicitly informs the Tx UE that configuration of the PC5-RRC NORMAL parameters succeeds but configuration of the Specific PC5 DRX parameters fails. At time t36, the Tx UE reconfigures the Specific PC5 DRX parameters for the Rx UE via RRCReconfigurationSidelink. At time t37, the Rx UE sends configuration success information via RRCReconfigurationCompleteSidelink.

Application Scenario 2

Figure 3:
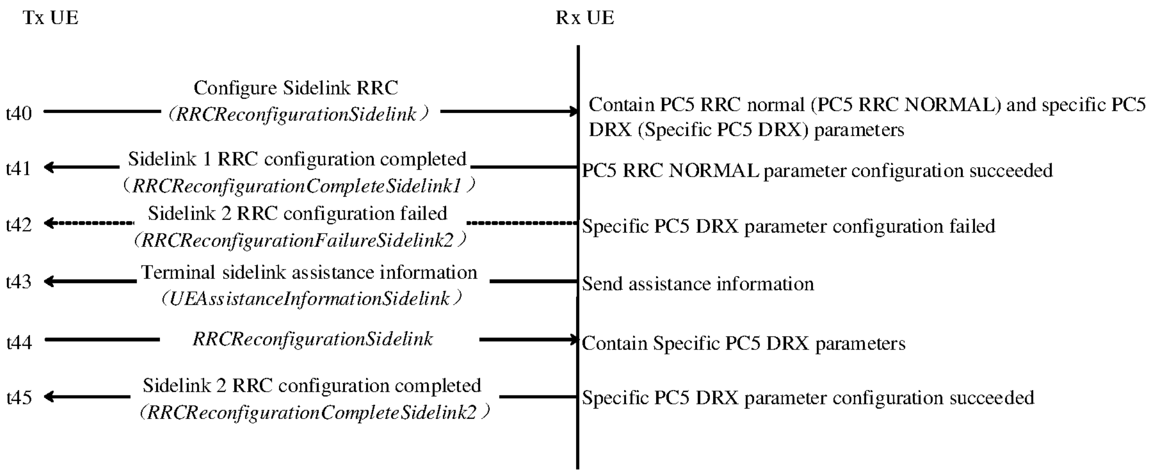
FIG. 3 is a schematic flowchart of a parallel configuration method.

As shown in FIG. 3, in the parallel configuration method, the Tx UE configures PC5-RRC NORMAL parameters and Specific PC5 DRX parameters for the Rx UE via RRCReconfigurationSidelink at time t40. Configuration of the PC5-RRC NORMAL parameters succeeds but configuration of the Specific PC5 DRX parameters fails. Therefore, the Rx UE sends PC5-RRC NORMAL parameter configuration success information via RRCReconfigurationCompleteSidelink1 at time t41. At time t42, the Rx UE sends Specific PC5 DRX configuration failure information via RRCReconfigurationFailureSidelink2.

At time t43, the Rx UE sends relevant assistance information to the Tx UE via UEAssistanceInformationSidelink. At time t44, the Tx UE reconfigures the Specific PC5 DRX parameters for the Rx UE via RRCReconfigurationSidelink based on the assistance information from the Rx UE and QoS requirements of the service. At time t45, the Rx UE sends configuration success information via RRCReconfigurationCompleteSidelink2.

In the parallel configuration method, the Rx UE explicitly informs the Tx UE that parameters are configured successfully or unsuccessfully.

Optionally, the Rx UE may not send RRCReconfigurationFailureSidelink2 at time t42, but directly sends assistance information to the Tx UE via UEAssistanceInformationSidelink at time t43. In other words, the Rx UE implicitly informs the Tx UE that configuration of the Specific PC5 DRX parameters fails, and requests the Tx UE to reconfigure the Specific PC5 DRX parameters based on the assistance information.

Application Scenario 3

Figure 4:
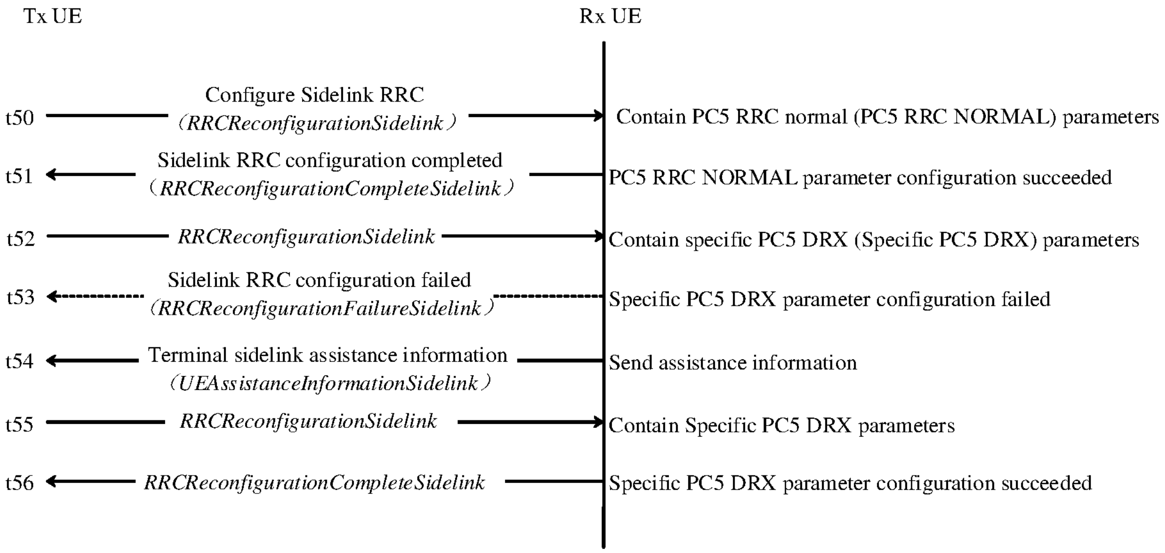
FIG. 4 is a schematic flowchart of a serial configuration method.

As shown in FIG. 4, in the serial configuration method, the Tx UE configures PC5-RRC NORMAL parameters for the Rx UE via RRCReconfigurationSidelink at time t50. The Rx UE sends configuration success information via RRCReconfigurationCompleteSidelink at time t51.

The Tx UE configures Specific PC5 DRX parameters for the Rx UE via RRCReconfigurationSidelink at time t52. The Specific PC5 DRX parameters configured by the Tx UE do not match those expected by the Rx UE. Therefore, the Rx UE sends configuration failure information via RRCReconfigurationFailureSidelink at time t53. Then, the Rx UE sends relevant assistance information to the Tx UE via UEAssistanceInformationSidelink at time t54. At time t55, the Tx UE reconfigures the Specific PC5 DRX parameters for the Rx UE via RRCReconfigurationSidelink. At time t56, the Rx UE sends configuration success information via RRCReconfigurationCompleteSidelink.

The Rx UE may not send RRCReconfigurationFailureSidelink at time t53, but directly sends the assistance information to the Tx UE via UEAssistanceInformationSidelink at time t54. In other words, the Rx UE implicitly informs the Tx UE that configuration of the Specific PC5 DRX parameters fails, and requests the Tx UE to reconfigure the Specific PC5 DRX parameters based on the assistance information.

Application Scenario 4

In this application scenario, the Tx UE updates PC5 QoS Flow in response to change of the unicast service, causing the Specific PC5 DRX to be reconfigured.

Figure 5:
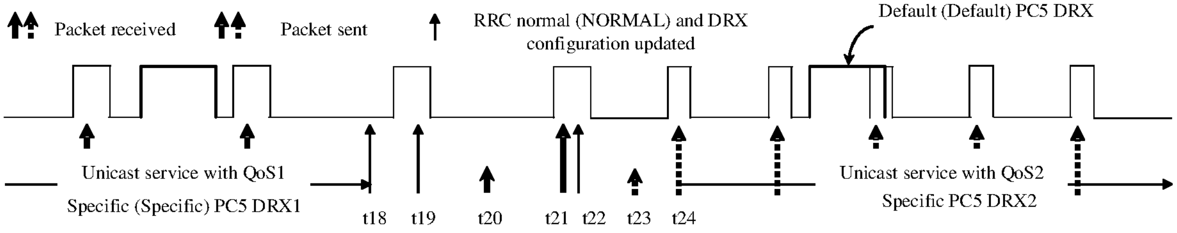
FIG. 5 is a schematic diagram of a configuration update process.

As shown in FIG. 5, before time t18, the application stratum of the Tx UE requests a QoS1-related unicast service. Therefore, the Tx UE sends a packet to the Rx UE via Specific PC5 DRX1 configuration. At time t18, the application stratum of the Tx UE changes the unicast service and determines to provide a QoS2-related unicast service. At the same time, the application stratum notifies the AS stratum via the V2X stratum to update the PC5-RRC NORMAL and Specific PC5 DRX.

It should be noted that in this embodiment, the PDB required by QoS1 is greater than the PDB required by QoS2. Therefore, the Specific PC5 DRX period required by a QoS2 service is correspondingly shorter than that required by a QoS1 service.

At time t19, the Tx UE sends a Link Modification Request to the Rx UE during the On-duration associated with the Specific PC5 DRX1, and at time t22, the Rx UE sends a Link Modification Accept to the Tx UE. In other words, the PC5-RRC NORMAL and the Specific PC5 DRX are updated between time t19 and time t22, occupying a total of two Specific PC5 DRX1-associated On-durations.

At time t18, after the application stratum requests an update of the PC5-RRC NORMAL and the Specific PC5 DRX through the AS stratum, a QoS2 related packet has reached the AS stratum at time t20. Because configuration of a new Specific PC5 DRX2 has not finished, the communication between the Tx UE and the Rx UE must be based on the Specific PC5 DRX1 configuration until time t22. As a result, at time t21, the Tx UE sends a new packet by using the On-duration associated with the Specific PC5 DRX1, where the new packet has reached at time t20.

After time t22, the PC5-RRC NORMAL configuration and Specific PC5 DRX configuration have been updated between the UEs in unicast. Therefore, when the QoS2-related packet reaches the AS stratum at time t23, the Tx UE sends the QoS2-related packet at time t24 in the On-duration associated with the Specific PC5 DRX2. Then, the Tx UE combines Default PC5 DRX On-duration and Specific PC5 DRX2 On-duration as the PC5-DRX active time and sends the QoS2-related packet.

The time t22 when RRCReconfigurationCompleteSidelink is sent and received is used as the switching time for Specific PC5 DRX parameter configuration, allowing for more flexible configuration and better alignment.

In conclusion, this embodiment of this application can achieve the following beneficial effects.

The PC5-RRC NORMAL parameters and the PC5-RRC DRX parameters are distinguished during configuration of the Specific PC5 DRX parameters for UEs in unicast, making overall configuration of the PC5-RRC NORMAL parameters of the system more flexible and effective.

The embodiment of this application solves the alignment problem of Specific PC5 DRX parameter configuration in the process of updating the unicast Specific PC5 DRX parameter configuration. The point of time when RRCReconfigurationCompleteSidelink is sent and received is used as the switching time for Specific PC5 DRX parameter configuration, allowing for more flexible configuration and better alignment of Specific PC5 DRX configuration for UEs in unicast.

It should be noted that the unicast sidelink configuration method provided in the embodiment of this application may be performed by a unicast sidelink configuration apparatus or a control module for performing the unicast sidelink configuration method in the unicast sidelink configuration apparatus. In this embodiment of this application, the unicast sidelink configuration apparatus according to this embodiment of this application is described by using an example in which the unicast sidelink configuration apparatus performs the unicast sidelink configuration method.

Figure 6:
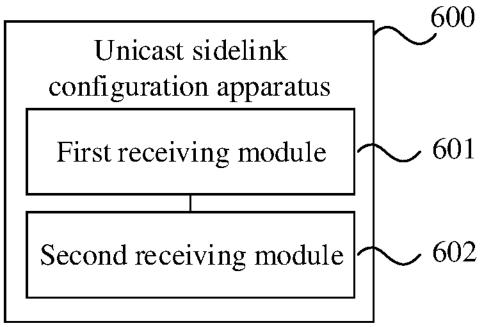
FIG. 6 is a first schematic diagram of modules of a unicast sidelink configuration apparatus according to an embodiment of this application.

As shown in FIG. 6, an embodiment of this application provides a unicast sidelink configuration apparatus 600. The apparatus is applied to a receive end configured with discontinuous reception DRX mode and includes:

a first receiving module 601, configured to: during a unicast sidelink establishment process, receive first radio resource control RRC parameter configuration information and first DRX parameter configuration information from a transmit end; and a second receiving module 602, configured to: receive the first RRC parameter configuration information resent by the transmit end, in a case that first RRC parameter configuration fails, and/or receive the first DRX parameter configuration information resent by the transmit end, in a case that first DRX parameter configuration fails.

Optionally, the first receiving module 601 is configured to:

during the unicast sidelink establishment process, receive the first RRC parameter configuration information and the first DRX parameter configuration information simultaneously sent by the transmit end via the sidelink RRC configuration information.

Optionally, when receiving the first DRX parameter configuration information resent by the transmit end, in a case that first DRX parameter configuration fails, the second receiving module 602 includes:

a fourth sending unit, configured to send assistance information to the transmit end in a case that first DRX parameter configuration fails; and a fourth receiving unit, configured to receive the first DRX parameter configuration information from the transmit end.

Optionally, after the first receiving module 601 receives the first radio resource control RRC parameter configuration information and the first DRX parameter configuration information from a transmit end during the unicast sidelink establishment process, the apparatus further includes:

a fifth sending module, configured to send sidelink RRC configuration failure information to the transmit end in a case that at least first RRC parameter configuration fails; and a fifth receiving module, configured to receive the first RRC parameter configuration information and the first DRX parameter configuration information from the transmit end.

Optionally, when receiving the first RRC parameter configuration information resent by the transmit end, in a case that first RRC parameter configuration fails, the second receiving module 602 includes:

a fifth sending unit, configured to send first sidelink RRC configuration failure information to the transmit end in a case that first RRC parameter configuration fails; and a fifth receiving unit, configured to receive the first RRC parameter configuration information from the transmit end.

Optionally, when receiving the first DRX parameter configuration information resent by the transmit end, in a case that first DRX parameter configuration fails, the second receiving module 602 includes:

a sixth sending unit, configured to send first information to the transmit end in a case that first DRX parameter configuration fails; and a sixth receiving unit, configured to receive the first DRX parameter configuration information from the transmit end, where the first information includes second sidelink RRC configuration failure information or assistance information.

Optionally, after the first receiving module 601 receives the first radio resource control RRC parameter configuration information and the first DRX parameter configuration information from a transmit end during the unicast sidelink establishment process, the apparatus further includes at least one of the following:

a fifth sending module, configured to send first sidelink RRC configuration complete information to the transmit end in a case that first RRC parameter configuration succeeds; or a sixth sending module, configured to send second sidelink RRC configuration complete information to the transmit end in a case that first DRX parameter configuration succeeds.

Optionally, the first receiving module 601 includes:

a first receiving unit, configured to: during the unicast sidelink establishment process, receive first target parameter configuration information sent by the transmit end via sidelink RRC configuration information;

a first sending unit, configured to send sidelink RRC configuration complete information to the transmit end in a case that first target parameter configuration succeeds; and a second receiving unit, configured to receive second target parameter configuration information sent by the transmit end via the sidelink RRC configuration information; where the first target parameter configuration information is one of the first RRC parameter configuration information and the first DRX parameter configuration information, and the second target parameter configuration information is another of the first RRC parameter configuration information and the first DRX parameter configuration information.

Optionally, after the first receiving unit receives the first target parameter configuration information sent by the transmit end via sidelink RRC configuration information during the unicast sidelink establishment process, the apparatus further includes:

a seventh sending unit, configured to send sidelink RRC configuration failure information to the transmit end in a case that first target parameter configuration fails; and a seventh receiving unit, configured to receive the first target parameter configuration information from the transmit end.

Optionally, the apparatus further includes:

a third receiving module, configured to receive a link update request after a unicast sidelink is established, where the link update request is used to indicate to update the first DRX parameter configuration information; and a first update module, configured to update the first DRX parameter configuration information after sidelink radio resource control configuration complete information is sent to the transmit end.

Optionally, the apparatus further includes:

a third sending module, configured to send a link update request after a unicast sidelink is established, where the link update request is used to indicate to update the first DRX parameter configuration information; and a second update module, configured to update the first DRX parameter configuration information after receiving sidelink radio resource control configuration complete information from the transmit end.

It should be noted that the first RRC parameter configuration information and the first DRX parameter configuration information are received from the transmit end, and therefore a parameter is reconfigured separately in a case that configuration of the parameter configuration information fails. In this way, the link establishment process is improved, ensuring that the receive end can enter the unicast energy-efficient mode after a unicast sidelink is established and service communication is performed successfully. In addition, this parameter configuration method can improve the link establishment efficiency, thereby reducing power consumption of terminals.

The unicast sidelink configuration apparatus in the embodiment of this application may be an apparatus, an apparatus or an electronic device with an operating system, or may be a component, an integrated circuit, or a chip of a terminal. The apparatus or electronic device may be a mobile terminal or a non-mobile terminal. For example, the mobile terminal may include but is not limited to a terminal side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes a smart watch, a wrist band, earphones, glasses, and the like. The non-mobile terminal may be a server, a network attached storage (NAS), a personal computer (PC), a television (TV), a teller machine, a self-service machine, or the like. This is not limited in the embodiments of this application.

The unicast sidelink configuration apparatus provided in this embodiment of this application can implement the processes of the method embodiment illustrated in FIG. 1, with the same technical effects. To avoid repetition, details are not described herein again.

An embodiment of this application further provides a terminal. The terminal is a receive end configured with discontinuous reception DRX mode, and includes a processor and a communication interface. The communication interface is configured to: during a unicast sidelink establishment process, receive first radio resource control RRC parameter configuration information and first DRX parameter configuration information from a transmit end; and receive the first RRC parameter configuration information resent by the transmit end, in a case that first RRC parameter configuration fails, and/or receive the first DRX parameter configuration information resent by the transmit end, in a case that first DRX parameter configuration fails.

Figure 7:
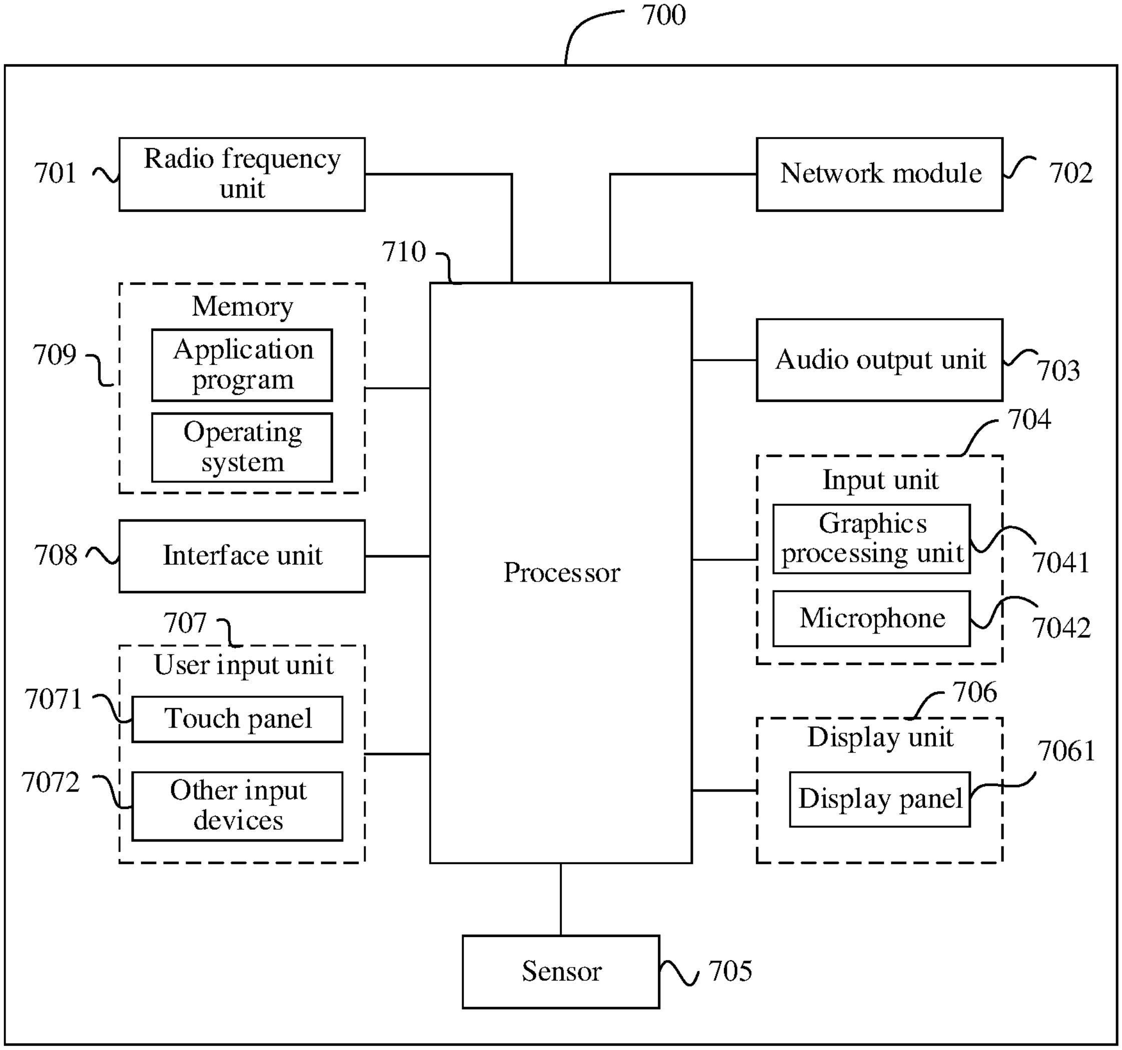
FIG. 7 is a structural block diagram of a terminal according to an embodiment of this application.

The terminal embodiment is corresponding to the foregoing embodiments of the unicast sidelink configuration method used on the receive end. All the implementation processes and implementation methods of the foregoing method embodiments can be applied to the terminal embodiment, with the same technical effects achieved. For example, FIG. 7 is a schematic diagram of a hardware structure of a terminal implementing the embodiments of this application.

A terminal 700 is a receive end configured with discontinuous reception DRX mode, including but not limited to at least some components of a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal 700 may further include a power source (for example, a battery) for supplying power to the components. The power source may be logically connected to the processor 710 through a power management system. In this way, functions such as charge management, discharge management, and power consumption management are implemented by using the power management system. The structure of the terminal shown in FIG. 7 does not constitute a limitation on the terminal. The terminal may include more or fewer components than illustrated in the figure, or combine some components, or have a different component arrangement. Details are not described again herein.

It should be understood that in the embodiments of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include a display panel 7061. The display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a functional button (such as a volume control button or a power on/off button), a trackball, a mouse, and a joystick. Details are not described again herein.

In the embodiments of this application, the radio frequency circuit 701 receives downlink data from the network-side device for processing by the processor 710, and sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions, and various data. The memory 709 may mainly include a program or instruction storage area and a data storage area. The program or instruction storage area may store an operating system, an application program or instructions required by at least one function (for example, an audio playing function and an image playing function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash storage device, or another non-volatile solid-state storage device.

The processor 710 may include one or more processing units. Optionally, the processor 710 may integrate an application processor and a modem processor. The application processor mainly processes an operating system, a user interface, an application program or instructions, and the like. The modem processor mainly processes wireless communication, for example, a baseband processor. It should be understood that alternatively, the modem processor may not be integrated into the processor 710.

The radio frequency unit 701 is configured to:

during a unicast sidelink establishment process, receive first radio resource control RRC parameter configuration information and first DRX parameter configuration information from a transmit end; and receive the first RRC parameter configuration information resent by the transmit end, in a case that first RRC parameter configuration fails, and/or receive the first DRX parameter configuration information resent by the transmit end, in a case that first DRX parameter configuration fails.

The terminal in the embodiment of this application receives the first RRC parameter configuration information and the first DRX parameter configuration information from the transmit end, and therefore a parameter is reconfigured separately in a case that configuration of the parameter configuration information fails. In this way, the link establishment process is improved, ensuring that the terminal can enter the unicast energy-efficient mode after a unicast sidelink is established and service communication is performed successfully. In addition, this parameter configuration method can improve the link establishment efficiency, thereby reducing power consumption of terminals.

Optionally, the radio frequency unit 701 is configured to:

during the unicast sidelink establishment process, receive the first RRC parameter configuration information and the first DRX parameter configuration information simultaneously sent by the transmit end via the sidelink RRC configuration information.

Optionally, the radio frequency unit 701 is configured to:

send assistance information to the transmit end in a case that first DRX parameter configuration fails; and receive the first DRX parameter configuration information from the transmit end.

Optionally, the radio frequency unit 701 is further configured to:

send sidelink RRC configuration failure information to the transmit end in a case that at least first RRC parameter configuration fails; and receive the first RRC parameter configuration information and the first DRX parameter configuration information from the transmit end.

Optionally, the radio frequency unit 701 is configured to:

send first sidelink RRC configuration failure information to the transmit end in a case that first RRC parameter configuration fails; and receive the first RRC parameter configuration information from the transmit end.

Optionally, the radio frequency unit 701 is configured to:

send first information to the transmit end in a case that first DRX parameter configuration fails; and receive the first DRX parameter configuration information from the transmit end, where the first information includes second sidelink RRC configuration failure information or assistance information.

Optionally, the radio frequency unit 701 is further configured to:

send first sidelink RRC configuration complete information to the transmit end in a case that first RRC parameter configuration succeeds; or send second sidelink RRC configuration complete information to the transmit end in a case that first DRX parameter configuration succeeds.

Optionally, the radio frequency unit 701 is configured to:

during the unicast sidelink establishment process, receive first target parameter configuration information sent by the transmit end via sidelink RRC configuration information;

send sidelink RRC configuration complete information to the transmit end in a case that first target parameter configuration succeeds; and receive second target parameter configuration information sent by the transmit end via the sidelink RRC configuration information; where the first target parameter configuration information is one of the first RRC parameter configuration information and the first DRX parameter configuration information, and the second target parameter configuration information is another of the first RRC parameter configuration information and the first DRX parameter configuration information.

Optionally, the radio frequency unit 701 is further configured to:

send sidelink RRC configuration failure information to the transmit end in a case that first target parameter configuration fails; and receive the first target parameter configuration information from the transmit end.

Optionally, the radio frequency unit 701 is further configured to:

receive a link update request after a unicast sidelink is established, where the link update request is used to indicate to update the first DRX parameter configuration information; and update, by the processor 710, the first DRX parameter configuration information after sidelink radio resource control configuration complete information is sent to the transmit end.

Optionally, the radio frequency unit 701 is further configured to:

send a link update request after a unicast sidelink is established, where the link update request is used to indicate to update the first DRX parameter configuration information.

The processor 710 is configured to update the first DRX parameter configuration information after receiving sidelink radio resource control configuration complete information from the transmit end.

Optionally, an embodiment of this application further provides a terminal. The terminal is a receive end configured with discontinuous reception DRX mode, including a processor, a memory, and a program or an instruction stored in the memory and executable on the processor. When the program or instruction is executed by the processor, the processes of the foregoing embodiments of the unicast sidelink configuration method are implemented, with the same technical effects achieved. To avoid repetition, details are not described herein again.

An embodiment of this application further provides a non-transitory readable storage medium, where the non-transitory readable storage medium stores a program or instructions, and when the program or instructions are executed by a processor, the processes of the foregoing embodiments of the unicast sidelink configuration method are implemented, with the same technical effects achieved. To avoid repetition, details are not described herein again. The non-transitory readable storage medium includes a non-transitory computer-readable storage medium, for example, a read-only memory (ROM), a random access memory (RAM), a magnetic disk, an optical disc, or the like.

Figure 8:
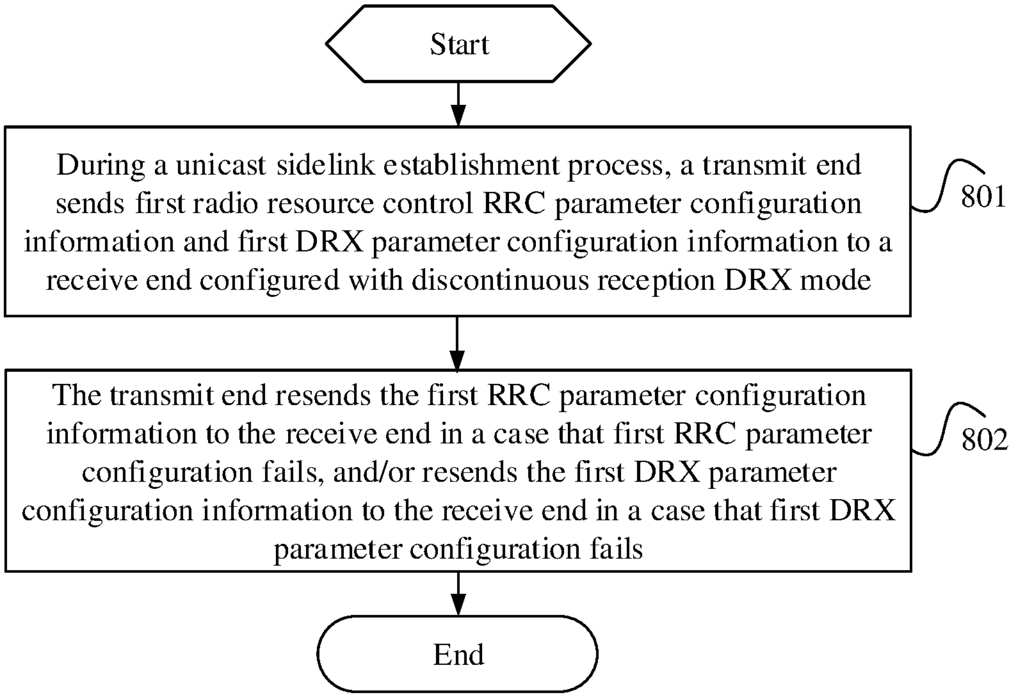
FIG. 8 is a schematic flowchart of a unicast sidelink configuration method applied to a transmit end according to an embodiment of this application.

As shown in FIG. 8, to cooperate with reception of the receive end, an embodiment of this application further provides a unicast sidelink configuration method. The method is applied to a transmit end and includes the following steps.

Step 801. During a unicast sidelink establishment process, a transmit end sends first radio resource control RRC parameter configuration information and first DRX parameter configuration information to a receive end configured with discontinuous reception DRX mode.

Step 802. The transmit end resends the first RRC parameter configuration information to the receive end in a case that first RRC parameter configuration fails, and/or resends the first DRX parameter configuration information to the receive end in a case that first DRX parameter configuration fails.

Optionally, the sending, by a transmit end, first radio resource control RRC parameter configuration information and first DRX parameter configuration information to a receive end configured with discontinuous reception DRX mode includes:

during the unicast sidelink establishment process, simultaneously sending, by the transmit end, the first RRC parameter configuration information and the first DRX parameter configuration information to the receive end via sidelink RRC configuration information.

Optionally, the resending, by the transmit end, the first DRX parameter configuration information to the receive end in a case that first DRX parameter configuration fails includes:

receiving, by the transmit end, assistance information sent by the receive end in a case that first DRX parameter configuration fails; and resending, by the transmit end, the first DRX parameter configuration information to the receive end.

Optionally, after the during a unicast sidelink establishment process, sending, by a transmit end, first radio resource control RRC parameter configuration information and first DRX parameter configuration information to a receive end configured with discontinuous reception DRX mode, the method further includes:

receiving, by the transmit end, sidelink RRC configuration failure information sent by the receive end in a case that at least first RRC parameter configuration fails; and resending, by the transmit end, the first RRC parameter configuration information and the first DRX parameter configuration information to the receive end.

Optionally, the resending, by the transmit end, the first RRC parameter configuration information to the receive end in a case that first RRC parameter configuration fails includes:

receiving, by the transmit end, first sidelink RRC configuration failure information sent by the receive end in a case that first RRC parameter configuration fails; and resending, by the transmit end, the first RRC parameter configuration information to the receive end.

Optionally, the resending, by the transmit end, the first DRX parameter configuration information to the receive end in a case that first DRX parameter configuration fails includes:

receiving, by the transmit end, first information sent by the receive end in a case that first DRX parameter configuration fails; and resending, by the transmit end, the first DRX parameter configuration information to the receive end; where the first information includes second sidelink RRC configuration failure information or assistance information.

Optionally, after the sending, by a transmit end, first radio resource control RRC parameter configuration information and first DRX parameter configuration information to a receive end configured with discontinuous reception DRX mode, the method further includes at least one of the following:

receiving, by the transmit end, first sidelink RRC configuration complete information sent by the receive end in a case that first RRC parameter configuration succeeds; or receiving, by the transmit end, second sidelink RRC configuration complete information sent by the receive end in a case that first DRX parameter configuration succeeds.

Optionally, the sending, by a transmit end, first radio resource control RRC parameter configuration information and first DRX parameter configuration information to a receive end configured with discontinuous reception DRX mode includes:

during the unicast sidelink establishment process, sending, by the transmit end, first target parameter configuration information to the receive end via sidelink RRC configuration information;

receiving sidelink RRC configuration complete information sent by the receive end in a case that first target parameter configuration succeeds;

sending, by the receive end, second target parameter configuration information to the receive end via the sidelink radio resource control configuration information; where the first target parameter configuration information is one of the first RRC parameter configuration information and the first DRX parameter configuration information, and the second target parameter configuration information is another of the first RRC parameter configuration information and the first DRX parameter configuration information.

Optionally, after the sending, by the transmit end, first target parameter configuration information to the receive end via sidelink RRC configuration information, the method further includes:

receiving, by the transmit end, sidelink RRC configuration failure information sent by the receive end in a case that first target parameter configuration fails; and resending the first target parameter configuration information to the receive end.

Optionally, the method further includes:

sending, by the transmit end, a link update request to the receive end after a unicast sidelink is established, where the link update request is used to indicate to update the first DRX parameter configuration information; and updating, by the transmit end, the first DRX parameter configuration information after receiving sidelink radio resource control configuration complete information from the receive end.

Optionally, the method further includes:

receiving, by the transmit end, a link update request from the receive end after a unicast sidelink is established, where the link update request is used to indicate to update the first DRX parameter configuration information; and updating, by the transmit end, the first DRX parameter configuration information after sidelink radio resource control configuration complete information is sent to the receive end.

It should be noted that all descriptions of the transmit end in the foregoing embodiments are applicable to the embodiments of the unicast sidelink configuration method for the transmit end, with the same technical effects achieved. Details are not described herein again.

Figure 9:
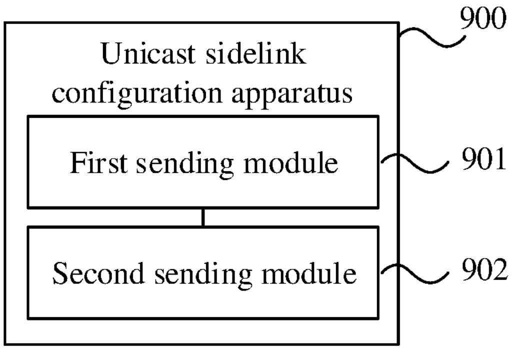
FIG. 9 is a second schematic diagram of modules of a unicast sidelink configuration apparatus according to an embodiment of this application.

As shown in FIG. 9, an embodiment of this application further provides a unicast sidelink configuration apparatus 900. The apparatus is applied to a transmit end and includes:

a first sending module 901, configured to: during a unicast sidelink establishment process, send first radio resource control RRC parameter configuration information and first DRX parameter configuration information to a receive end configured with discontinuous reception DRX mode; and a second sending module 902, configured to resend the first RRC parameter configuration information to the receive end in a case that first RRC parameter configuration fails, and/or resend the first DRX parameter configuration information to the receive end in a case that first DRX parameter configuration fails.

Optionally, the first sending module 901 is configured to:

during the unicast sidelink establishment process, simultaneously send the first RRC parameter configuration information and the first DRX parameter configuration information to the receive end via sidelink RRC configuration information.

Optionally, when the transmit end resends the first DRX parameter configuration information to the receive end in a case that first DRX parameter configuration fails, the second sending module 902 includes:

an eighth receiving unit, configured to receive assistance information sent by the receive end in a case that first DRX parameter configuration fails; and an eighth sending unit, configured to resend the first DRX parameter configuration information to the receive end.

Optionally, after the transmit end sends the first radio resource control RRC parameter configuration information and the first DRX parameter configuration information to the receive end configured with discontinuous reception DRX mode during the unicast sidelink establishment process, the first sending module 901 further includes:

a seventh sending module, configured for the transmit end to receive sidelink RRC configuration failure information sent by the receive end in a case that at least first RRC parameter configuration fails; and an eighth sending module, configured to resend the first RRC parameter configuration information and the first DRX parameter configuration information to the receive end.

Optionally, when the transmit end resends the first RRC parameter configuration information to the receive end in a case that first RRC parameter configuration fails, the second sending module 902 includes:

a ninth receiving unit, configured to receive first sidelink RRC configuration failure information sent by the receive end in a case that first RRC parameter configuration fails; and a ninth sending unit, configured to resend the first RRC parameter configuration information to the receive end.

Optionally, when the transmit end resends the first DRX parameter configuration information to the receive end in a case that first DRX parameter configuration fails, the second sending module 902 includes:

a tenth receiving unit, configured to receive first information sent by the receive end in a case that first DRX parameter configuration fails; and a tenth sending unit, configured to resend the first DRX parameter configuration information to the receive end; where the first information includes second sidelink RRC configuration failure information or assistance information.

Optionally, after the first sending module 901 sends the first radio resource control RRC parameter configuration information and the first DRX parameter configuration information to the receive end configured with discontinuous reception DRX mode, the apparatus further includes at least one of the following:

a sixth receiving module, configured to receive first sidelink RRC configuration complete information sent by the receive end in a case that first RRC parameter configuration succeeds; or a seventh receiving module, configured to receive second sidelink RRC configuration complete information sent by the receive end in a case that first DRX parameter configuration succeeds.

Optionally, the first sending module 901 includes:

a second sending unit, configured to: during the unicast sidelink establishment process, send first target parameter configuration information to the receive end via sidelink RRC configuration information;

a third receiving unit, configured to receive sidelink RRC configuration complete information sent by the receive end in a case that first target parameter configuration succeeds; and a third sending unit, configured to send second target parameter configuration information to the receive end via the sidelink radio resource control configuration information; where the first target parameter configuration information is one of the first RRC parameter configuration information and the first DRX parameter configuration information, and the second target parameter configuration information is another of the first RRC parameter configuration information and the first DRX parameter configuration information.

Optionally, after the second sending unit sends the first target parameter configuration information to the receive end via sidelink RRC configuration information, the apparatus further includes:

an eleventh receiving unit, configured to receive sidelink RRC configuration failure information sent by the receive end in a case that first target parameter configuration fails; and an eleventh sending unit, configured to resend the first target parameter configuration information to the receive end.

Optionally, the apparatus includes:

a fourth sending module, configured to send a link update request to the receive end after a unicast sidelink is established, where the link update request is used to indicate to update the first DRX parameter configuration information; and a third update module, configured to update the first DRX parameter configuration information after receiving sidelink radio resource control configuration complete information from the receive end.

Optionally, the apparatus includes:

a fourth receiving module, configured to receive a link update request from the receive end after a unicast sidelink is established, where the link update request is used to indicate to update the first DRX parameter configuration information; and a fourth update module, configured to update the first DRX parameter configuration information after sidelink radio resource control configuration complete information is sent to the receive end.

It should be noted that this apparatus embodiment corresponds to the foregoing method embodiments on a one-to-one basis. All implementations of the foregoing embodiments are applicable to this apparatus embodiment, with the same technical effects achieved. Details are not described herein again.

Optionally, an embodiment of this application further provides a terminal. The terminal is a transmit end, including a processor, a memory, and a program or an instruction stored in the memory and executable on the processor. When the program or instruction is executed by the processor, the processes of the foregoing embodiments of the unicast sidelink configuration method applied to the transmit end are implemented, with the same technical effects achieved. To avoid repetition, details are not described herein again.

An embodiment of this application further provides a non-transitory readable storage medium, where the non-transitory readable storage medium stores a program or instructions, and when the program or instructions are executed by a processor, the processes of the foregoing embodiments of the unicast sidelink configuration method applied to the transmit end are implemented, with the same technical effects achieved. To avoid repetition, details are not described herein again.

The non-transitory readable storage medium includes a non-transitory computer-readable storage medium, for example, a read-only memory (ROM), a random access memory (RAM), a magnetic disk, or an optical disc.

An embodiment of this application provides a terminal. The terminal is a transmit end and includes a processor and a communication interface. The communication interface is configured to: during a unicast sidelink establishment process, send first radio resource control RRC parameter configuration information and first DRX parameter configuration information to a receive end configured with discontinuous reception DRX mode; and resend the first RRC parameter configuration information to the receive end in a case that first RRC parameter configuration fails, and/or resend the first DRX parameter configuration information to the receive end in a case that first DRX parameter configuration fails.

The terminal embodiment is corresponding to the foregoing embodiments of the method used on the transmit end. All the implementation processes and implementation methods of the foregoing method embodiments can be applied to the terminal embodiment, with the same technical effects achieved.

Optionally, an embodiment of this application further provides a terminal, and the terminal is a transmit end. For example, the structure of the transmit end is similar to that of the receive end shown in FIG. 7, and will not be described herein again.

Optionally, the radio frequency unit is configured to:

during a unicast sidelink establishment process, send first radio resource control RRC parameter configuration information and first DRX parameter configuration information to a receive end configured with discontinuous reception DRX mode; and resend the first RRC parameter configuration information to the receive end in a case that first RRC parameter configuration fails, and/or resend the first DRX parameter configuration information to the receive end in a case that first DRX parameter configuration fails.

Optionally, the radio frequency unit is configured to:

during the unicast sidelink establishment process, simultaneously send the first RRC parameter configuration information and the first DRX parameter configuration information to the receive end via sidelink RRC configuration information.

Optionally, the radio frequency unit is configured to:

receive assistance information sent by the receive end in a case that first DRX parameter configuration fails; and resend the first DRX parameter configuration information to the receive end.

Optionally, the radio frequency unit is further configured to:

receive sidelink RRC configuration failure information sent by the receive end in a case that at least first RRC parameter configuration fails; and resend the first RRC parameter configuration information and the first DRX parameter configuration information to the receive end.

Optionally, the radio frequency unit is configured to:

receive first sidelink RRC configuration failure information sent by the receive end in a case that first RRC parameter configuration fails; and resend the first RRC parameter configuration information to the receive end.

Optionally, the radio frequency unit is configured to:

receive first information sent by the receive end in a case that first DRX parameter configuration fails; and resend the first DRX parameter configuration information to the receive end; where the first information includes second sidelink RRC configuration failure information or assistance information.

Optionally, the radio frequency unit is further configured to perform at least one of the following:

receiving first sidelink RRC configuration complete information sent by the receive end in a case that first RRC parameter configuration succeeds; or receiving second sidelink RRC configuration complete information sent by the receive end in a case that first DRX parameter configuration succeeds.

Optionally, the radio frequency unit is configured to:

during the unicast sidelink establishment process, send first target parameter configuration information to the receive end via sidelink RRC configuration information;

receive sidelink RRC configuration complete information sent by the receive end in a case that first target parameter configuration succeeds;

send second target parameter configuration information to the receive end via the sidelink radio resource control configuration information; where the first target parameter configuration information is one of the first RRC parameter configuration information and the first DRX parameter configuration information, and the second target parameter configuration information is another of the first RRC parameter configuration information and the first DRX parameter configuration information.

Optionally, the radio frequency unit is further configured to:

receive sidelink RRC configuration failure information sent by the receive end in a case that first target parameter configuration fails; and resend the first target parameter configuration information to the receive end.

Optionally, the radio frequency unit is further configured to:

send a link update request to the receive end after a unicast sidelink is established, where the link update request is used to indicate to update the first DRX parameter configuration information; and update, by the processor, the first DRX parameter configuration information after receiving sidelink radio resource control configuration complete information from the receive end.

Optionally, the radio frequency unit is further configured to:

receive a link update request from the receive end after a unicast sidelink is established, where the link update request is used to indicate to update the first DRX parameter configuration information; and update, by the processor, the first DRX parameter configuration information after sidelink radio resource control configuration complete information is sent to the receive end.

It should be noted that the unicast sidelink configuration apparatuses applied to the transmit end and the receive end as described in the embodiments of this application may be provided on the same device. That is, the device can implement the functions of sending and receiving information.

Figure 10:
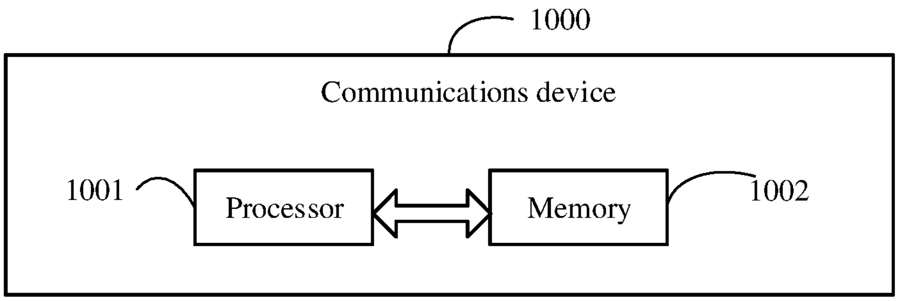
FIG. 10 is a structural block diagram of a communications device according to an embodiment of this application.

Optionally, as shown in FIG. 10, an embodiment of this application further provides a communications device 1000, including a processor 1001, a memory 1002, and a program or instructions stored in the memory 1002 and executable on the processor 1001. For example, in a case that the communications device 1000 is a receive end and the program or instructions are executed by the processor 1001, all processes of the foregoing embodiments of the unicast sidelink configuration method for the receive end are implemented, with the same technical effects achieved. In a case that the communications device 1000 is a transmit end and the program or instructions are executed by the processor 1001, all processes of the foregoing embodiments of the unicast sidelink configuration method for the transmit end are implemented, with the same technical effects achieved. To avoid repetition, details are not described herein again.

The terminal involved in the embodiment of this application may be a device that provides a user with voice and/or data connectivity, a handheld device with a wireless connection function, or another processing device connected to a wireless modem. The terminal devices may have different designations in different systems. For example, in a 5G system, the terminal device may be referred to as user equipment (UE). The wireless terminal device may communicate with one or more core networks (CN) through a radio access network (RAN). The wireless terminal device may be a mobile terminal device such as a mobile phone (also referred to as a "cellular" phone) or a computer having a mobile terminal device, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiated protocol (SIP) phone, a wireless local loop (WLL) station, or a personal digital assistant (PDA). The wireless terminal device may also be referred to as a system, a subscriber unit, a subscriber station, a mobile station, a mobile terminal, a remote station, an access point, a remote terminal, an access terminal device, a user terminal device, a user agent, or a user device. This is not limited herein.

The network-side device involved in the embodiments of this application may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB), a relay station, or an access point in LTE, or may be a base station in a future 5G network, or the like, which is not limited herein.

Multi input multi output (MIMO) transmission may be performed between a network-side devices and a terminal using one or more antennas on each, and the MIMO transmission may be single user MIMO (SU-MIMO) or multiple user MIMO (MU-MIMO). Depending on the form and quantity of root antenna combinations, the MIMO transmission may be two-dimensional MIMO (2D-MIMO), three-dimensional MIMO (3D-MIMO), full dimension MIMO (FD-MIMO), or massive MIMO, or may be diversity transmission, precoded transmission, or beamforming transmission, or the like.

An embodiment of this application further provides a chip, where the chip includes a processor and a communication interface, the communication interface is coupled to the processor, and the processor is configured to run a program or instructions to implement the processes of the unicast sidelink configuration method embodiment, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a computer program product, where the computer program product is stored in a non-volatile readable storage medium. The computer program product is executed by at least one processor to implement the processes of the foregoing embodiments of the unicast sidelink configuration method, with the same technical effects achieved. To avoid repetition, details are not described herein again.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scopes of the method and apparatus in the implementations of this application are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the implementations, persons skilled in the art may clearly understand that the method in the foregoing embodiments may be implemented by software with a necessary general hardware platform. Certainly, the method in the foregoing embodiments may also be implemented by hardware. Based on such an understanding, the technical solutions of this application essentially or the part contributing to the prior art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A unicast sidelink configuration method, comprising:

during a unicast sidelink establishment process, receiving, by a receive end configured with discontinuous reception (DRX) mode, first radio resource control (RRC) parameter configuration information and first DRX parameter configuration information from a transmit end; and receiving, by the receive end, the first DRX parameter configuration information resent by the transmit end, in a case that first DRX parameter configuration fails;

wherein receiving, by the receive end, the first RRC parameter configuration information and the first DRX parameter configuration information from the transmit end comprises:

receiving, by the receive end, the first RRC parameter configuration information and the first DRX parameter configuration information simultaneously sent by the transmit end via sidelink RRC configuration information;

wherein receiving, by the receive end, the first DRX parameter configuration information resent by the transmit end, in the case that the first DRX parameter configuration fails comprises:

sending, by the receive end, assistance information to the transmit end in the case that the first DRX parameter configuration fails; and receiving, by the receive end, the first DRX parameter configuration information from the transmit end.

2. The method according to claim 1, after the receiving, by a receive end, first RRC parameter configuration information and first DRX parameter configuration information from a transmit end, further comprising at least one of following:

sending, by the receive end, first sidelink RRC configuration complete information to the transmit end in a case that first RRC parameter configuration succeeds; or sending, by the receive end, second sidelink RRC configuration complete information to the transmit end in a case that first DRX parameter configuration succeeds.

3. The method according to claim 1, further comprising:

receiving, by the receive end, a link update request after a unicast sidelink is established, wherein the link update request is used to indicate to update the first DRX parameter configuration information; and updating, by the receive end, the first DRX parameter configuration information after sending sidelink radio resource control configuration complete information to the transmit end;

or sending, by the receive end, a link update request after a unicast sidelink is established, wherein the link update request is used to indicate to update the first DRX parameter configuration information; and updating, by the receive end, the first DRX parameter configuration information after receiving sidelink radio resource control configuration complete information from the transmit end.

4. A unicast sidelink configuration method, comprising:

during a unicast sidelink establishment process, sending, by a transmit end, first radio resource control (RRC) parameter configuration information and first discontinuous reception (DRX) parameter configuration information to a receive end configured with DRX mode; and resending, by the transmit end, the first DRX parameter configuration information to the receive end in a case that first DRX parameter configuration fails;

wherein sending, by the transmit end, the first RRC parameter configuration information and the first DRX parameter configuration information to the receive end configured with the DRX mode comprises:

simultaneously sending, by the transmit end, the first RRC parameter configuration information and the first DRX parameter configuration information to the receive end via sidelink RRC configuration information;

wherein resending, by the transmit end, the first DRX parameter configuration information to the receive end in the case that first DRX parameter configuration fails comprises:

receiving, by the transmit end, assistance information sent by the receive end in the case that the first DRX parameter configuration fails; and resending, by the transmit end, the first DRX parameter configuration information to the receive end.

5. The method according to claim 4, after the sending, by a transmit end, first RRC parameter configuration information and first DRX parameter configuration information to a receive end configured with DRX mode, further comprising at least one of following:

receiving, by the transmit end, first sidelink RRC configuration complete information sent by the receive end in a case that first RRC parameter configuration succeeds; or receiving, by the transmit end, second sidelink RRC configuration complete information sent by the receive end in a case that first DRX parameter configuration succeeds.

6. The method according to claim 4, further comprising:

sending, by the transmit end, a link update request to the receive end after a unicast sidelink is established, wherein the link update request is used to indicate to update the first DRX parameter configuration information; and updating, by the transmit end, the first DRX parameter configuration information after receiving sidelink radio resource control configuration complete information from the receive end;

or receiving, by the transmit end, a link update request from the receive end after a unicast sidelink is established, wherein the link update request is used to indicate to update the first DRX parameter configuration information; and updating, by the transmit end, the first DRX parameter configuration information after sidelink radio resource control configuration complete information is sent to the receive end.

7. A terminal, wherein the terminal is a receive end configured with discontinuous reception (DRX) mode and comprises a processor, a memory, and a program or instructions stored in the memory and executable on the processor, wherein the program or instructions, when executed by the processor, cause the receive end to perform:

during a unicast sidelink establishment process, receiving first radio resource control (RRC) parameter configuration information and first DRX parameter configuration information from a transmit end; and receiving the first DRX parameter configuration information resent by the transmit end, in a case that first DRX parameter configuration fails;

wherein the program or instructions, when executed by the processor, cause the receive end to perform:

receiving the first RRC parameter configuration information and the first DRX parameter configuration information simultaneously sent by the transmit end via sidelink RRC configuration information;

sending assistance information to the transmit end in the case that the first DRX parameter configuration fails; and receiving the first DRX parameter configuration information from the transmit end.

8. A terminal, wherein the terminal is a transmit end and comprises a processor, a memory, and a program or instructions stored in the memory and executable on the processor, wherein when the program or instructions are executed by the processor, steps of the unicast sidelink configuration method according to claim 4 are implemented.

* * * * *